US012677172B2

(12) United States Patent
Määttänen et al.

(10) Patent No.: US 12,677,172 B2
(45) Date of Patent: Jul. 7, 2026

(54) BEAM FAILURE DETECTION

(71) Applicant: Telefonaktiebolaget LM Ericsson (publ), Stockholm (SE)

(72) Inventors: Helka-Liina Määttänen, Espoo (FI); Icaro Leonardo Da Silva, Solna (SE); Siva Muruganathan, Stittsville (CA); Andreas Nilsson, Gothenburg (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 420 days.

(21) Appl. No.: 18/034,642

(22) PCT Filed: Oct. 29, 2021

(86) PCT No.: PCT/IB2021/060050
§ 371 (c)(1),
(2) Date: Apr. 28, 2023

(87) PCT Pub. No.: WO2022/091032
PCT Pub. Date: May 5, 2022

(65) Prior Publication Data
US 2023/0413077 A1 Dec. 21, 2023

Related U.S. Application Data

(60) Provisional application No. 63/108,000, filed on Oct. 30, 2020.

(51) Int. Cl.
| | |
|---|---|
| *H04W 24/08* | (2009.01) |
| *H04B 7/06* | (2006.01) |
| *H04L 5/00* | (2006.01) |
| *H04W 72/231* | (2023.01) |

(52) U.S. Cl.
CPC ........ *H04W 24/08* (2013.01); *H04B 7/06964* (2023.05); *H04L 5/0048* (2013.01);
(Continued)

(58) Field of Classification Search
CPC . H04W 24/08; H04W 72/231; H04W 72/046; H04L 5/0048; H04L 5/0053;
(Continued)

(56) References Cited

U.S. PATENT DOCUMENTS

| | | | | |
|---|---|---|---|---|
| 2020/0213987 A1* | 7/2020 | Venugopal | .......... | H04W 72/046 |
| 2020/0314676 A1* | 10/2020 | Lin | ........................ | H04L 5/0094 |

(Continued)

FOREIGN PATENT DOCUMENTS

WO 2020/069415 A1 4/2020

OTHER PUBLICATIONS

International Search Report and Written Opinion issued in International Application No. PCT/IB2021/060050 dated Apr. 7, 2022 (19 pages).

(Continued)

*Primary Examiner* — Dady Chery
(74) *Attorney, Agent, or Firm* — Rothwell, Figg, Ernst & Manbeck, P.C.

(57) ABSTRACT

A method (200) performed by a UE (102). The method includes receiving (s202) one or more messages for activating at least i) a first set of configured TCI states and ii) a second set of configured TCI states, wherein the first set of activated TCI states is associated with a first PCI and indicates a first set of reference signals, and the second set of activated TCI states is associated with a second PCI and indicates a second set of reference signals. The method also includes performing (s204) beam failure detection, BFD, monitoring. Performing the BFD monitoring comprises: determining (s206) whether a beam failure with respect to the first PCI has occurred based on the first set of reference signals; and determining (s208) whether a beam failure with respect to the second PCI has occurred based on the second set of reference signals.

20 Claims, 5 Drawing Sheets

(52) U.S. Cl.
CPC .......... *H04L 5/0053* (2013.01); *H04L 5/0094*
(2013.01); *H04W 72/231* (2023.01)

(58) Field of Classification Search
CPC ..... H04L 5/0094; H04B 7/0695; H04B 7/024;
H04B 7/06964
See application file for complete search history.

(56) References Cited

U.S. PATENT DOCUMENTS

| | | | | |
|---|---|---|---|---|
| 2020/0351055 | A1* | 11/2020 | Manolakos | H04B 7/088 |
| 2022/0109489 | A1* | 4/2022 | Zhu | H04L 1/1614 |
| 2022/0132517 | A1* | 4/2022 | Zhu | H04L 5/0051 |
| 2022/0201504 | A1* | 6/2022 | Fujimura | H04W 16/28 |

OTHER PUBLICATIONS

Qualcomm, "Enhancements on Multi-beam Operation", vol. RAN WG1, No. e-meeting: Oct. 26-Nov. 13, 2020, Oct. 24, 2020 (Oct. 24, 2020), 3GPP Draft; R1-2009250 (12 pages).

LG Electronics, "Enhancements on Multi-beam Operation", 3GPP TSG RAN WG1 #103-e, R1-2008573, e-Meeting, Oct. 26-Nov. 13, 2020 (11 pages).

Ericsson, "Enhancements to multi-beam operation", 3GPP TSG-RAN WG1 Meeting #102-e, Tdoc R1-2005842, e-Meeting, Aug. 17-28, 2020 (16 pages).

3GPP TS 38.321 V16.2.0 (Sep. 2020) (154 pages).

3GPP TS 38.133 V16.5.0 (ETSI version) (Dec. 2020) (1,610 pages).

3GPP TS 38.331 V16.2.0 (Sep. 2020) (921 pages).

3GPP TS 38.213 V16.3.0 (ETSI version—ETSI TS 138 213) (Nov. 2020) (181 pages).

Samsung, "New WID: Further enhancements on MIMO for NR", 3GPP TSG RAN Meeting #86, RP-193133, Sitges, Spain, Dec. 9-12, 2019 (5 pages).

Intel Corporation, "Multi-TRP enhancements for inter-cell operation", 3GPP Draft; R1-2008979, 3rd Generation Partnership Project (3GPP), Mobile Competence Centre ; 650, Route Des Lucioles ; F-06921 Sophiaantipolis Cedex; France, vol. RAN WG1, No. e-Meeting; Oct. 26-Nov. 13, 2020 Oct. 24, 2020, XP051946763, 5 pages.

* cited by examiner

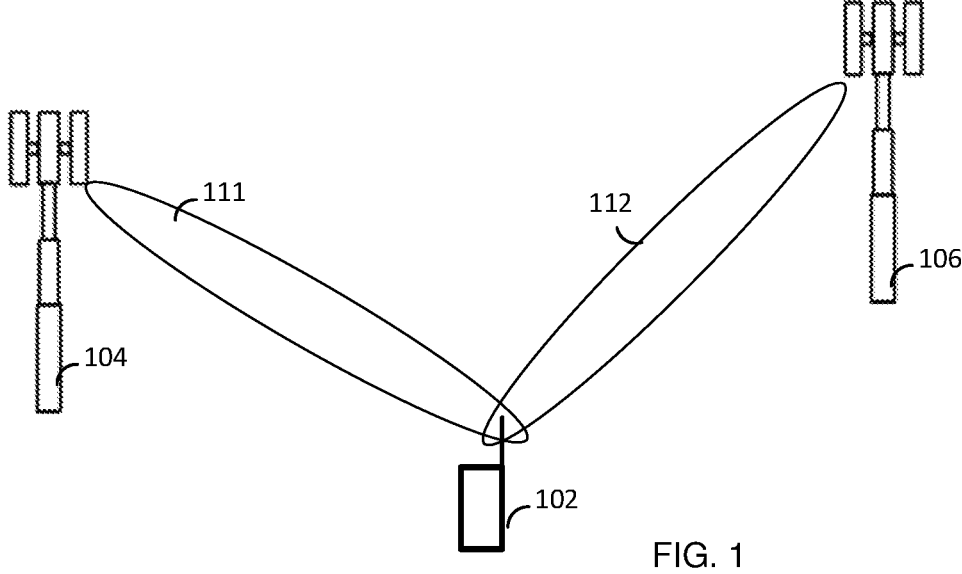

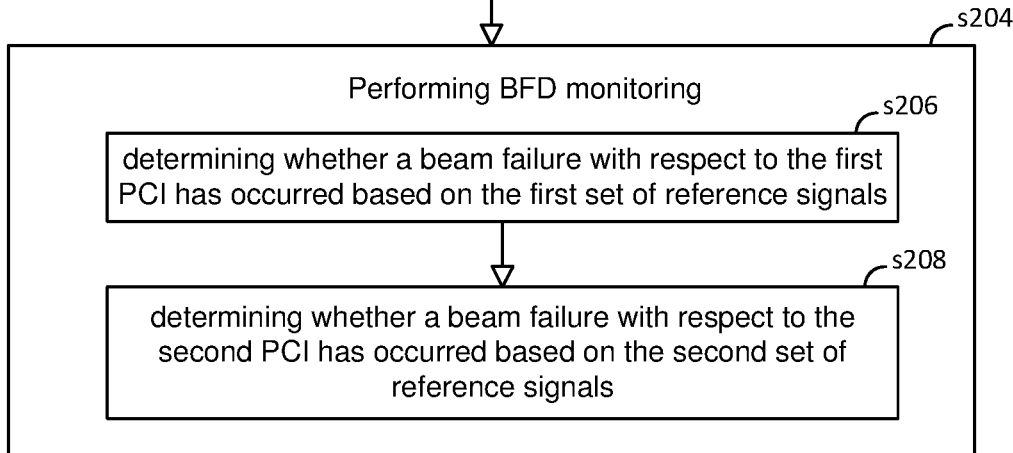

s202 receiving one or more messages for activating at least i) a first set of configured TCI states and ii) a second set of configured TCI states wherein the first set of activated TCI states is associated with a first PCI configured for the UE and indicates a first set of reference signals, and the second set of activated TCI states is associated with a second PCI configured for the UE and indicates a second set of reference signals s204

Performing BFD monitoring s206 determining whether a beam failure with respect to the first PCI has occurred based on the first set of reference signals s208 determining whether a beam failure with respect to the second PCI has occurred based on the second set of reference signals

FIG. 2

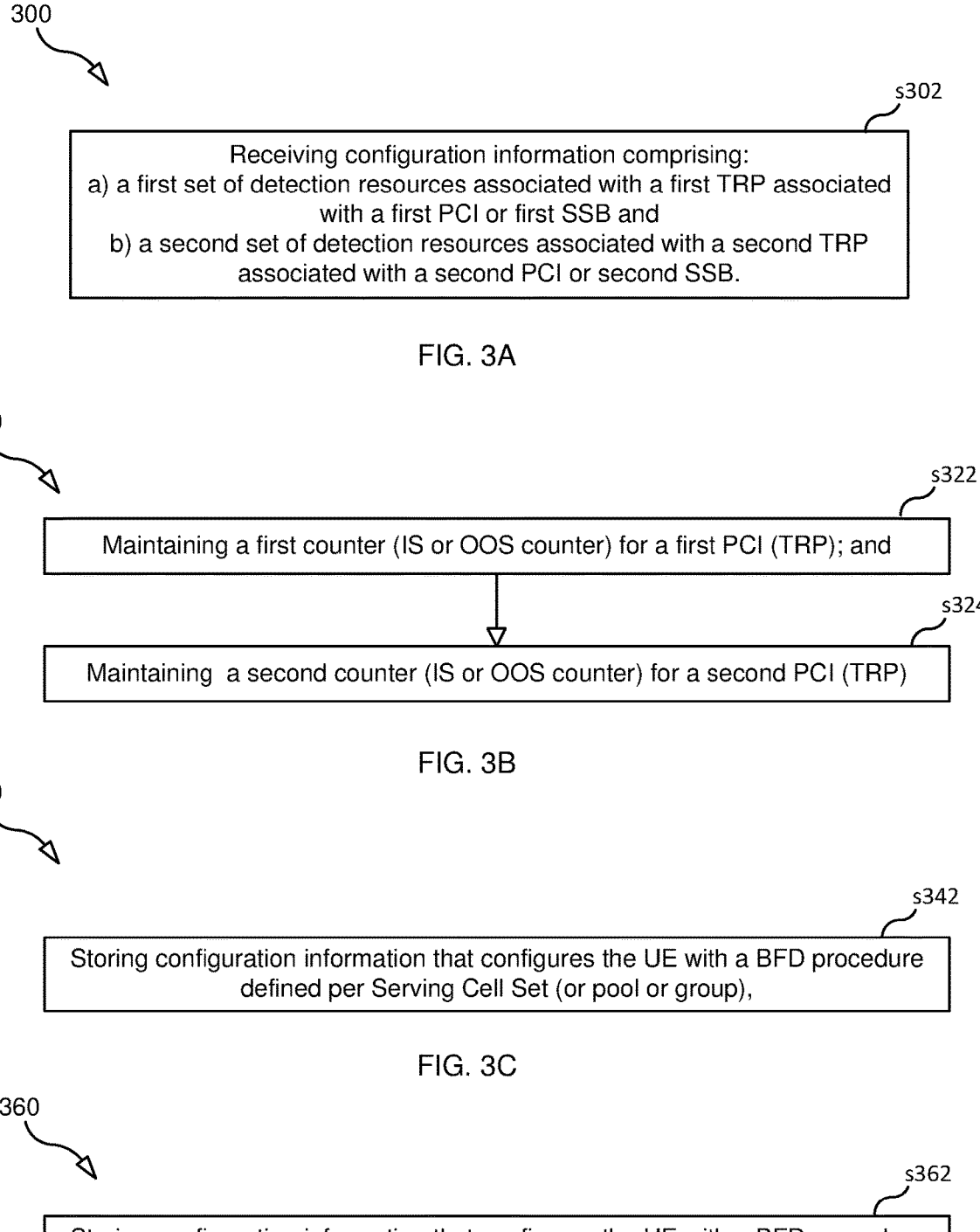

300 s302

Receiving configuration information comprising:
a) a first set of detection resources associated with a first TRP associated with a first PCI or first SSB and
b) a second set of detection resources associated with a second TRP associated with a second PCI or second SSB.

Maintaining a first counter (IS or OOS counter) for a first PCI (TRP); and s324

Maintaining a second counter (IS or OOS counter) for a second PCI (TRP)

Storing configuration information that configures the UE with a BFD procedure defined per Serving Cell Set (or pool or group),

Storing configuration information that configures the UE with a BFD procedure defined for a Serving Cell associated with multiple PCIs

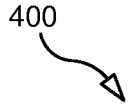

s402

Transmitting toward a UE configuration information comprising:
a) a first set of detection resources associated with a first TRP associated with a first PCI or first SSB and
b) a second set of detection resources associated with a second TRP associated with a second PCI or second SSB.

s422

Transmitting toward a UE configuration information that configures the UE with a BFD procedure defined per Serving Cell Set (or pool or group)

s442

Transmitting toward a UE configuration information that configures the UE with a BFD procedure defined for a Serving Cell associated with multiple PCIs

| forming a first set of one or more BFD reference signal resources for a first PCI (PCI-1) | s504

| forming a second set of one or more BFD reference signal resources for a second PCI (PCI-2) | s506

| using the first set of BFD reference signal resources to determine whether or not a beam failure with respect to PCI-1 has occurred | s508

| using the second set of BFD reference signal resources to determine whether or not a beam failure with respect to PCI-2 has occurred |

FIG. 5

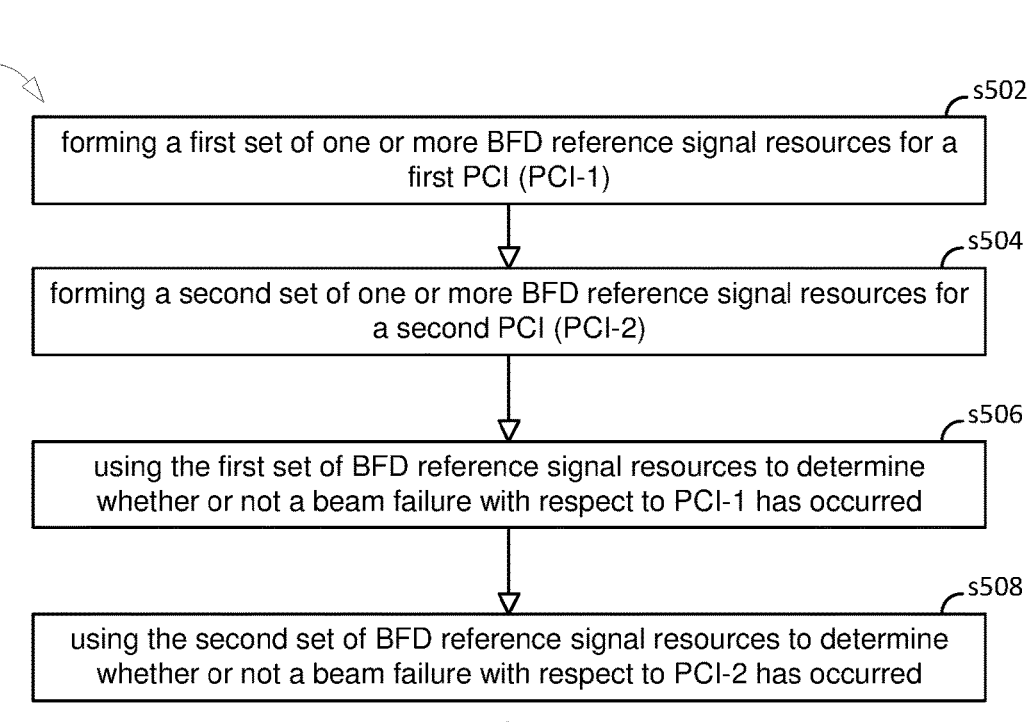

FIG. 6

BEAM FAILURE DETECTION

CROSS REFERENCE TO RELATED APPLICATIONS

This application is a 35 U.S.C. § 371 National Stage of International Patent Application No. PCT/IB2021/060050, filed 2021 Oct. 29, which claims priority to U.S. provisional application No. 63/108,000, filed on 2020 Oct. 30, which is incorporated by this reference.

RELATED APPLICATION

This application claims priority to U.S. provisional application No. 63/108,000, filed on Oct. 30, 2020.

TECHNICAL FIELD

This disclosure relates to beam failure detection.

BACKGROUND

Beam Failure Detection (BFD) in New Radio (NR)

BFD and Beam Failure Recovery (BFR) are features introduced in NR since release 15 (Rel-15). For the purpose of BFD, the network configures a user equipment (UE) with BFD reference signals (RSs) (Synchronization Signal Block (SSB), Channel State Information RS (CSI-RS), or both SSB/CSI-RS resources) and the UE declares beam failure when the number of beam failure instance indications from the physical layer reaches a configured threshold before a configured timer expires. SSB-based BFD is based on the SSB associated with the initial downlink (DL) Bandwidth Part (BWP) and can only be configured for the initial DL BWPs and for DL BWPs containing the SSB associated with the initial DL BWP. For other DL BWPs, BFD can only be performed based on CSI-RS.

Resources for BFD can be explicitly configured via a Radio Resource Control (RRC) message (i.e., as part of the SpCellConfig within each dedicated BWP configuration—BWP-DownlinkDedicated in an RRCReconfiguration or RRCResume message) within the RadioLinkMonitoring-Config Information Element (IE), described in Third Generation Partnership Project (3GPP) Technical Specification (TS) 38.331 V16.2.0 (hereafter "TS 38.331").

The configured thresholds for BFD are Qout,LR and Qin,LR and correspond to the default value of rlmInSyncOutOfSyncThreshold, as described in 3GPP TS 38.133 V16.5.0 for Qout, and to the value provided by rsrp-ThresholdSSB or rsrp-ThresholdBFR-r16, respectively.

The physical layer in the UE assesses the radio link quality according to the set $\overline{q}_0$ of resource configurations against the threshold Qout,LR. For the set $\overline{q}_0$, the UE assesses the radio link quality only according to periodic CSI-RS resource configurations, or SS/Physical Broadcast Channel (PBCH) blocks on the primary cell (PCell) or the primary secondary cell group (PSCell), that are quasi-co-located (QCL) with the demodulation RS (DM-RS) of the Physical Downlink Control Channel (PDCCH) receptions monitored by the UE. The UE applies the $Q_{in,LR}$ threshold to the level 1 (L1) Reference Signal Received Power (RSRP) (L1-RSRP) measurement obtained from a SS/PBCH block. The UE applies the $Q_{in,LR}$ threshold to the L1-RSRP measurement obtained for a CSI-RS resource after scaling a respective CSI-RS reception power with a value provided by powerControlOffsetSS.

In non-discontinuous reception (non-DRX) mode operation, the physical layer in the UE provides an indication to higher layers when the radio link quality for all corresponding resource configurations in the set $\overline{q}_0$ that the UE uses to assess the radio link quality is worse than the threshold Qout,LR. In other words, if at least one resource is above the threshold Qout,LR, the physical layer does not indicate BFD to the higher layers. The physical layer informs the higher layers when the radio link quality is worse than the threshold Qout,LR with a periodicity determined by the maximum between the shortest periodicity among the periodic CSI-RS configurations, and/or SS/PBCH blocks on the PCell or the PSCell, in the set $\overline{q}_0$ that the UE uses to assess the radio link quality and 2 msec. In discontinuous reception (DRX) mode, the physical layer provides an indication to higher layers when the radio link quality is worse than the threshold Qout,LR with a periodicity determined in TS 38.133.

BFD Based on Transmission Configuration Indicator (TCI) State Configuration:

A UE can be provided, for each BWP of a serving cell, a set ($\overline{q}_0$) of periodic CSI-RS resource configuration indexes by failureDetectionResources and a set ($\overline{q}_1$) of periodic CSI-RS resource configuration indexes and/or SS/PBCH block indexes by candidateBeamRSList or candidateBeamRSListExt-r16 or candidateBeamRSSCellList-r16 for radio link quality measurements on the BWP of the serving cell.

If the UE is not provided $\overline{q}_0$ by failureDetectionResources or beamFailureDetectionResourceList for a BWP of the serving cell, the UE determines the set $\overline{q}_0$ to include periodic CSI-RS resource configuration indexes with same values as the RS indexes in the RS sets indicated by TCI-State for respective Control Resource Sets (CORESETs) that the UE uses for monitoring PDCCH and, if there are two RS indexes in a TCI state, the set $\overline{q}_0$ includes RS indexes with QCL-Type D configuration for the corresponding TCI states. The UE expects the set $\overline{q}_0$ to include up to two RS indexes.

This is indicated as part of the TCI state configuration (within the PDSCH configuration, PDSCH-Config, in a DL BWP configuration):

```
TCI-State ::=                    SEQUENCE {
tci-StateId                        TCI-StateId,
qcl-Type1                          QCL-Info,
qcl-Type2                          QCL-Info          OPTIONAL,     --
Need R
...
}
QCL-Info ::=                     SEQUENCE {
cell                     ServCellIndex          OPTIONAL,    -- Need R
bwp-Id                     BWP-Id               OPTIONAL,    -- Cond
CSI-RS-Indicated
referenceSignal                  CHOICE {
csi-rs                   NZP-CSI-RS-ResourceId,
ssb                      SSB-Index
},
qcl-Type                   ENUMERATED {typeA, typeB, typeC, typeD},
...
}
TAG-TCI-STATE-STOP
-- ASN1STOP
```

In current specifications, each PDCCH configuration (which is part of a DL BWP configuration, up to 3 per BWP per cell) comprises one or multiple CORESETs, configured as follows:

```
PDCCH-Config ::=      SEQUENCE {
controlResourceSetToAddModList   SEQUENCE(SIZE (1..3)) OF ControlResourceSet      OPTIONAL, --
Need N
(...)
}
```

If the UE is configured with multiple CORESETs, then the UE needs to monitor multiple PDCCHs in the configured CORESETs for a given BWP. Each CORESET is associated to one or more TCI states (e.g. indicating which beam that CORESET may be transmitted on (i.e., may be monitored by the UE). As one can see, each CORESET has an associated TCI state configuration:

```
ASN1START
TAG-CONTROLRESOURCESET-START
ControlResourceSet ::=          SEQUENCE {
controlResourceSetId        ControlResourceSetId,
(...)
tci-StatesPDCCH-ToAddList         SEQUENCE(SIZE (1..maxNrofTCI-StatesPDCCH)) OF
TCI-StateId OPTIONAL, -- Cond NotSIB1-initialBWP
(...)
}
TAG-CONTROLRESOURCESET-STOP
-- ASN1STOP
```

In the case the UE is configured with Multi-Radio Dual Connectivity (MR-DC), the UE is configured with a Secondary Cell Group (SCG). When the UE is configured with SCG, two Medium Access Control (MAC) entities are configured to the UE: one for the MCG and one for the SCG.

The functions of the different MAC entities in the UE operate independently unless otherwise specified. The timers and parameters used in each MAC entity are configured independently unless otherwise specified. The Serving Cells, C-RNTI, radio bearers, logical channels, upper and lower layer entities, Logical Channel Groups (LCGs), and Hybrid Automatic Repeat Request (HARQ) entities considered by each MAC entity refer to those mapped to that MAC entity unless otherwise specified.

If the MAC entity is configured with one or more secondary cells (SCells), there are multiple DL shared channel (DL-SCH) and there may be multiple uplink (UL) shared channel (UL-SCH) as well as multiple Random Access Channel (RACH) per MAC entity; one DL-SCH, one UL-SCH, and one RACH on the SpCell, one DL-SCH, zero or one UL-SCH and zero or one RACH for each SCell.

If the MAC entity is not configured with any SCell, there is one DL-SCH, one UL-SCH, and one RACH per MAC entity.

According to the current MAC specification, BFD procedure is defined per serving cell, e.g. SpCell, or an SCell in a given cell group (e.g. MCG and/or SCG). BFD is used for indicating to the serving gNB of a new SSB or CSI-RS when beam failure is detected on the serving SSB(s)/CSI-RS(s).

Beam failure is detected by counting beam failure instance (BFI) indication(s) from the lower layers to the MAC entity. If beamFailureRecoveryConfig is reconfigured by upper layers during an ongoing Random Access (RA) procedure for beam failure recovery for SpCell, the MAC entity shall stop the ongoing RA procedure and initiate a RA procedure using the new configuration.

RRC configures the following parameters in the BeamFailureRecoveryConfig and the RadioLinkMonitoringConfig for the Beam Failure Detection and Recovery procedure: beamFailureInstanceMaxCount for the beam failure detection; beamFailureDetectionTimer for the beam failure detection; beamFailureRecoveryTimer for the beam failure recovery procedure; rsrp-ThresholdSSB: an RSRP threshold for the beam failure recovery.

The following UE variables are used for the BFD procedure: BFI_COUNTER (per Serving Cell): counter for beam failure instance indication which is initially set to 0.

The MAC entity shall for each Serving Cell configured for beam failure detection operate as follows in the table below:

```
if beam failure instance indication has been received from lower layers:
start or restart the beamFailureDetectionTimer;
increment BFI_COUNTER by 1;
2> if BFI_COUNTER >= beamFailureInstanceMaxCount:
    3> if the Serving Cell is SCell:
        4> trigger a BFR for this Serving Cell;
    3> else:
        4> initiate a Random Access procedure (see clause 5.1) on the SpCell.
if the beamFailureDetectionTimer expires; or
if beamFailureDetectionTimer, beamFailureInstanceMaxCount, or any of the reference signals used for beam
failure detection is reconfigured by upper layers associated with this Serving Cell:
set BFI_COUNTER to 0.
if the Serving Cell is SpCell and the Random Access procedure initiated for SpCell beam failure recovery is
successfully completed (see clause 5.1):
set BFI_COUNTER to 0;
stop the beamFailureRecoveryTimer, if configured;
```

-continued consider the Beam Failure Recovery procedure successfully completed.
else if the Serving Cell is SCell, and a PDCCH addressed to C-RNTI indicating uplink grant for a new
transmission is received for the HARQ process used for the transmission of the BFR MAC CE or Truncated BFR
MAC CE which contains beam failure recovery information of this Serving Cell; or
if the SCell is deactivated as specified in clause 5.9:
set BFI_COUNTER to 0;
consider the Beam Failure Recovery procedure successfully completed and cancel all the triggered BFRs for this
Serving Cell.

Multi-Transmission and Reception Point (Multi-TRP) Based on Multi-PDCCH and CORESET Pool Index:

In Rel-16, the concept of multi-PDCCH (mPDCCH) multi-TRP (mTRP) transmissions has been introduced together with the concept of CORESET pool index. In the mTRP mPDCCH feature, a UE is configured with a CORE-SETPoolIndex per CORESET. Thus, the TCI states activated in the CORESETs with the same CORESETPoolIndex are associated with the same CORESETPoolIndex. In 3GPP specifications, the CORESETPoolIndex is used to represent a TRP.

mTRP Based on Single-PDCCH (sPDCCH) and MAC Control Element (CE):

In Rel-16 (see 3GPP TS 38.321 V16.2.0 section 6.1.3.24 "Enhanced TCI States Activation/Deactivation for UE-specific PDSCH MAC CE"), the concept of single PDCCH mTRP has been introduced where a UE receives a MAC CE which can provide a mapping of two TCI states related to a codepoint of a TCI field in Downlink Control Information (DCI). When two TCI states are mapped to a codepoint of a TCI field in DCI, each of the two TCI states represents a TRP. The MAC CE can also map one or more of the TCI field codepoints to a single TCI state. Hence, some codepoints of the TCI field may be mapped to two TCI states while some other ones may be mapped to a single TCI state. Hence, the TCI state to codepoint mapping provided by the MAC CE allows dynamic switching between single TRP transmission and multi-TRP transmission when DCI switches from a TCI field codepoint mapped to a single TCI state to a TCI field codepoint mapped to two TCI states.

L1 Based Inter-Cell Mobility in Rel-17:

In Rel-17, 3GPP is going to standardize what is called so far L1/L2 centric inter-cell mobility. This is justified in the Work Item Description (WID) RP-193133 (Further enhancements on MIMO for NR) by the fact that while Rel-16 manages to offer some reduction in overhead and/or latency, high-speed vehicular scenarios (e.g. a UE traveling at high speed on highways) at FR2 require more aggressive reduction in latency and overhead—not only for intra-cell, but also for L1/L2 centric inter-cell mobility.

That translates in the following objective: Enhancement on multi-beam operation, mainly targeting FR2 while also applicable to FR1:

(A) Identify and specify features to facilitate more efficient (lower latency and overhead) DL/UL beam management to support higher intra- and L1/L2-centric inter-cell mobility and/or a larger number of configured TCI states: i) Common beam for data and control transmission/reception for DL and UL, especially for intra-band CA; ii) Unified TCI framework for DL and UL beam indication; and iii) enhancement on signaling mechanisms for the above features to improve latency and efficiency with more usage of dynamic control signaling (as opposed to RRC); and (B) Identify and specify features to facilitate UL beam selection for UEs equipped with multiple panels, con-sidering UL coverage loss mitigation due to MPE, based on UL beam indication with the unified TCI framework for UL fast panel selection.

Even though 3GPP has not decided how a L1/L2 inter-cell centric mobility should be standardized, the understanding for the purpose of this disclosure is that the UE receives a L1/L2 signaling (instead of RRC signaling) indicating a TCI state (e.g. for PDCCH) possibly associated to an SSB whose Physical Cell Identifier (PCI) is not necessarily the same as the PCI of the cell the UE has connected to e.g. via connection resume or connection establishment. In other words, L1/L2-centric inter-cell mobility procedure can be interpreted as a beam management operation expanding the coverage of multiple SSBs associated to multiple PCIs (e.g. possibly associated to the same cell or different cells).

SUMMARY

Certain challenges presently exist. For example, the existing BFD procedures in NR are defined per serving cell, and these procedures essentially assume the deployment of a single TRP; but, in a multi-TRP deployment, one of the TRPs may experience beam failure (e.g., due to blockage of the channel between one TRP and the UE) while the other TRP may still be functioning with good channel quality. Hence, one problem to solve is how to detect beam failure when beam failure occurs on only one TRP (or a subset of TRPs) to which the UE is connected. The existing BFD procedures defined in NR are not suitable for this since the existing procedures are defined per serving cell. Moreover, the TRP is not visible to either the MAC entity or the RRC layer.

Accordingly, in one aspect there is provided a method performed by a UE. The method includes receiving one or more messages for activating at least i) a first set of configured TCI states and ii) a second set of configured TCI states, wherein the first set of activated TCI states is associated with a first PCI and indicates a first set of reference signals, and the second set of activated TCI states is associated with a second PCI and indicates a second set of reference signals. The method also includes performing beam failure detection, BFD, monitoring. Performing the BFD monitoring comprises: determining whether a beam failure with respect to the first PCI has occurred based on the first set of reference signals; and determining whether a beam failure with respect to the second PCI has occurred based on the second set of reference signals.

In another aspect there is provided a computer program comprising instructions which when executed by processing circuitry of a UE causes the UE to perform any one of the UE methods disclosed herein. In another aspect there is provided a carrier containing the computer program, wherein the carrier is one of an electronic signal, an optical signal, a radio signal, and a computer readable storage medium. In another aspect there is provided a UE, where the UE is configured to perform any one of the UE methods disclosed herein. In some embodiments, the UE includes processing circuitry and a memory containing instructions executable by the processing circuitry, whereby the UE is configured to perform any one of the UE methods disclosed herein.

An advantage of the embodiments disclosed herein is that they limit the implication of designing BFR or BFD per TRP as much as possible to physical layer, thereby avoiding the need to modify higher layer operation in order to accommodate per TRP BFR/BFD.

BRIEF DESCRIPTION OF THE DRAWINGS

FIG. 1 illustrates an example use case according to some embodiments.

FIG. 2 is a flowchart illustrating a process according to some embodiments.

FIGS. 3A-3D are flowcharts illustrating processes according to some embodiments.

FIGS. 4A-4C are flowcharts illustrating processes according to some embodiments.

FIG. 5 is a flowchart illustrating a process according to some embodiments.

FIG. 6 illustrates a UE according to some embodiments.

DETAILED DESCRIPTION

Figure 7:
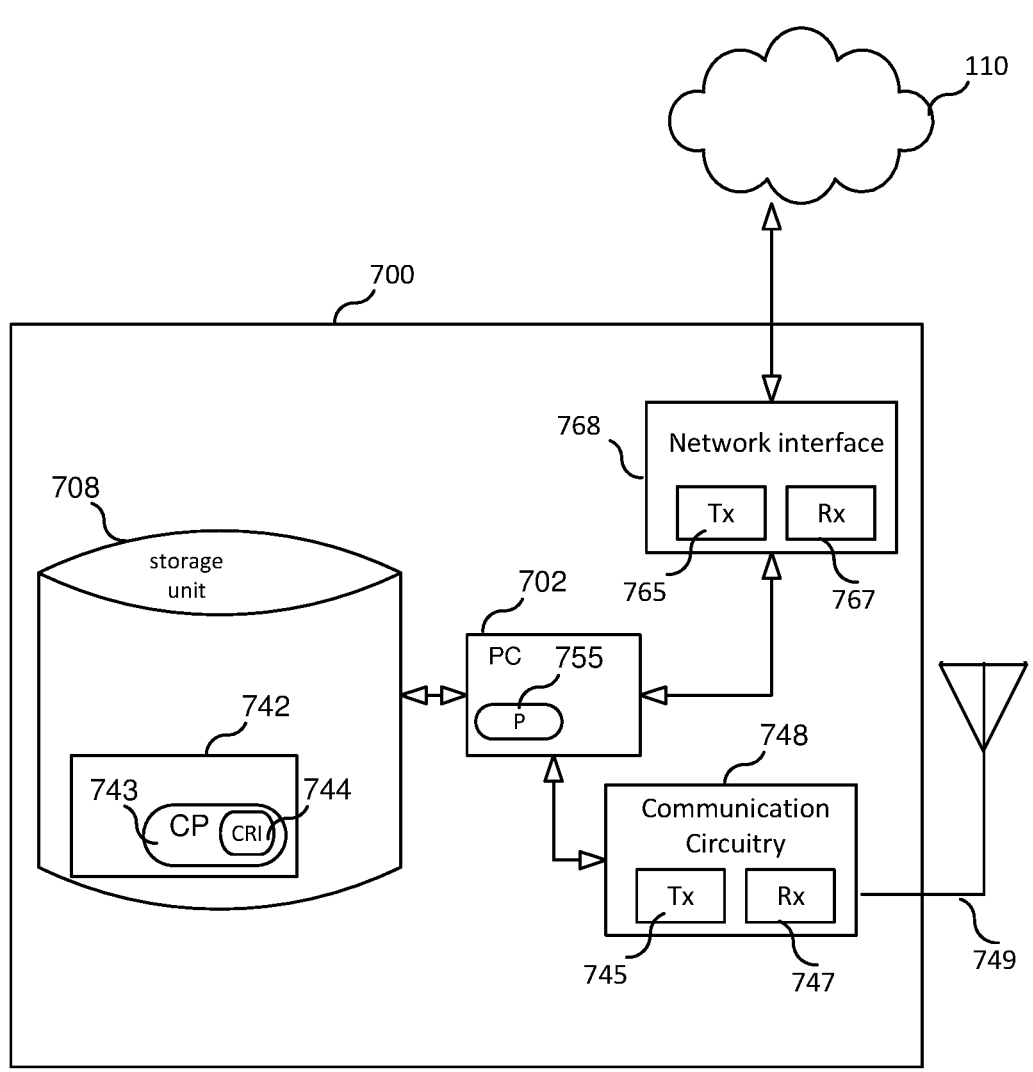
FIG. 7 illustrates a network node according to some embodiments.

For this disclosure, a TRP may be either a network node, a radio head, a spatial relation, or a TCI state. A TRP may be represented by a spatial relation or a TCI state in some embodiments. In some embodiments, a TRP may be using multiple TCI states.

This disclosure refers to the term "L1/L2 inter-cell centric mobility" as used in the 3GPP WID, though it interchangeably also uses the terms L1/L2 mobility, L1-mobility or L1/L2-centric mobility. For the understanding of this disclosure, L1/L2 centric mobility refers to a UE in RRC_CONNECTED being connected (i.e., being served by) to at least one serving cell, considered to be the PCell or a set of serving cells. The UE would be configured with multiple PCIs (e.g. PCI-2, PCI-3, PCI-4), wherein each PCI, or equivalently stated, any SSB beam related to the PCI, can be used as a QCL source in a TCI state with which the UE is configured. As used herein PCI and TRP may sometimes be used interchangeably.

This disclosure refers to a group or set of multiple PCIs, or a set of PCIs, or a pool of PCIs, or a list of PCIs, or a sequence of PCIs, to refer to the same concept. In other words, the terms group, set, pool, list and sequence are used interchangeably. In prior art, when multiple PCIs are configured for the UE's serving cell, the UE assumes that the QCL source of a TCI state is a Reference Signal (RS) associated to the serving cell's first PCI (i.e., the PCI in ServingCellConfigCommon).

Even though the term "L1/L2 inter-cell centric mobility" has the term "inter-cell", a fundamental aspect is that the UE is configured with more than one PCI, and for that there are at least 2 approaches:

(1): Intra-cell multi-PCI L1/L2 centric mobility, where same serving cell configuration is associated to more than one PCI; for BFD, according to the method, one implication is that resources to be monitored for BFD are reference signals associated to more than one PCI; and (2): Inter-cell multi-PCI L1/L2 centric mobility, where UE has several serving cell configurations with respective PCIs associated but TCI state may refer to other serving cell PCIs e.g. a Serving Cell Set. For BFD, according to the method, one implication is that resources to be monitored for BFD are reference signals associated to more than one serving cell within the serving cell.

Approach (1) Intra-Cell Multi-PCI L1/L2 Centric Mobility

The UE can receive a MAC CE from the network to indicate the TCI state to be associated to a given PDCCH configuration, while PDSCH TCI state association can be provided via Downlink Control Indication (DCI). Upon reception, the UE knows which TCI state (e.g. in which downlink beam PDCCH is being transmitted and should be monitored/received) is associated to a given PDCCH configured to be monitored. In other words, in a system where SS/PBSH Blocks (SSB)s are transmitted in different beams for a given cell with a given PCI, a TCI indication for a given PDCCH configurations triggers the UE to monitor PDCCH in a given beam of that cell associated to its PCI, in this case, a beam/SSB of the serving cell where that TCI state is configured.

However, for the first approach, for a given serving cell configuration, there can be a different PCI in a TCI state configuration compared to the PCI in ServingCellConfigCommon, e.g. PCI-1, which is an additional PCI e.g. PCI-2. In that case, the UE receiving the MAC CE needs to determine the PCI associated to the indicated TCI, to determine the SSB (or CSI-RS) associated, hence, determine the downlink beam. If it receives a TCI with PCI indicating PCI-2, for example, the UE needs to monitor PDCCH in a beam/SSB associated to PCI-2.

Same Cell, Change PCI, Similar ServingCellConfigCommon:

In a first variant of the first approach, the ServingCellConfigCommon before and after the TCI state indication associated to a different PCI than the one in ServingCellConfigCommon (e.g. PCI-2) remains the same, except for the PCI. Hence, the UE is still assumed to be in the same cell after the TCI state indication (e.g. MAC CE) whose TCI state has a different PCI associated to it (not necessarily signaled in the MAC CE, as the TCI state identifier in the MAC CE enables the UE to identify the PCI associated).

Same cell, change PCI, ServingCellConfigCommon has some PCI-specific configuration(s):

In a second variant, the UE is configured with at least one PCI-specific configuration. In other words, the UE has a ServingCellConfigCommon, valid for the PCI indicated on it, but it contains some further PCI-specific configuration so that upon receiving an indication for a different PCI the UE switches configuration.

In this example, the UE may apply the new ServingCellConfigCommon (for the new PCI in the MAC CE) on top of the previous ServingCellConfigCommon (e.g. in a delta-signaling manner). That reduces the amount of signaling for the PCI-specific configurations, in case some of the configurations are the same.

Another way to configure the UE is that in serving cell config the UE is configured with SSB sets that has other PCI associated to it. These SSB sets would have an index and in TCI state configuration an index of SSB set is referred to together with exact SSB beam index from that SSB set. It is possible these sets will be named differently to reflect "inter PCI candidates," thus SSB set index is an example of an RRC configuration specific ID given to the PCI(SSB set) to be used in the L1/L2 mobility in UE's current RRC configuration.

Approach (2) Inter-Cell Multi-PCI L1/L2 Centric Mobility

Conventionally, the UE assumes that the QCL source of a configured TCI state is a Reference Signal (RS) associated to the serving cell's single configured PCI (i.e. the PCI in ServingCellConfigCommon). However, in Approach 2, the UE can be configured with a different PCI in the TCI state configuration wherein these PCIs are considered to be associated with different cells. That is, the UE can have different serving cell configurations for these PCIs.

In other words, the UE is configured with a list of TCI states, meaning that it is configured with a list of additional cells, as the different PCIs are PCIs of different cells (each TCI state has its own PCI, but the same PCI may be used by multiple TCI states). These could be considered as some kind of serving cells (e.g., if these are all in the same frequency (like same ARFCN for their SSB) these could be considered as intra-frequency serving cells, where one is considered to be active at the time (except if some form of multi-TRP transmission is enabled)).

mTRP/Inter-Cell

Even though the term "mTRP/inter-cell" has the term "inter-cell", a fundamental aspect is that the UE is configured with more than one PCI, and for that there are at least 2 approaches exist:

Approach (1) Intra-cell multi-PCI multi-TRP, where same serving cell configuration is associated to more than one PCI; For BFD in mTRP, according to the method, one implication is that resources to be monitored for BFD can be reference signals associated to more than one PCI (differently from prior art), wherein different PCIs may be transmitted by different TRPs.

Approach (2) Inter-cell multi-PCI multi-TRP, where UE has several serving cell configurations with respective PCIs associated but TCI state may refer to other serving cell PCIs e.g. a Serving Cell Set. For BFD in mTRP, according to the method, one implication is that resources to be monitored for BFD can be reference signals associated to more than one serving cell within the serving cell (differently from prior art), wherein each serving cell has its associated PCI being transmitted by a different TRP.

Beam Failure Detection (BFD)

In some embodiments, the UE is configured with a BFD procedure defined per Serving Cell Set (or pool or group), where each Serving Cell in the Set can be associated with its (PCI, and where each cell in the set may be in the same frequency (e.g. SSB's ARFCN for each of the cells being the same).

In one embodiment, TCI states can be configured for the Serving Cell Set, e.g. by associating a PCI to a TCI state configuration, wherein the UE can be configured to perform multi-TRP/inter-cell operation among the cells within the Serving Cell Set.

In one embodiment, TCI states can be configured for the Serving Cell Set, e.g. by associating a PCI to a TCI state configuration, where the UE can be configured to perform L1/L2-centric mobility operation among the cells within the Serving Cell Set.

In some embodiments, the UE is configured with a BFD procedure defined for a Serving Cell associated with multiple PCIs, wherein each Serving Cell is configured with TCI states that can be associated with different PCIs e.g. TCI state Id=5 associated to PCI=102, and TCI state Id=7 associated to PCI=117, and wherein each PCI in the set may be in the same frequency (e.g. SSB's ARFCN for each of the PCIs being the same).

In one embodiment TCI states can be configured for the Serving Cell e.g. by associating a PCI to a TCI state configuration, wherein the UE can be configured to perform multi-TRP/inter-cell operation among the PCIs within the Serving Cell.

In one embodiment TCI states can be configured for the Serving Cell e.g. by associating a PCI to a TCI state configuration, wherein the UE can be configured to perform L1/L2-centric mobility operation among the PCIs within the Serving Cell.

Configuration of Resources

In one embodiment, the time and frequency resources where RSs to be monitored are being transmitted and configured to the UE by the network are grouped to two or more groups. The grouping can be according to the CORESETPoolIndexes or according to additional SSB/PCI set the UE is configured with in the serving cell configuration.

If no SSB/CSI-RS are configured as beam detection reference signals, the UE should assume that the reference signals used as QCL-type D sources for the TCI states used for the CORESETs should be used as beam detection reference signals instead. These beam failure detection reference signals should then be grouped according to the CORESETPoolIndexes (i.e. the SSB/CSI-RS used as QCL type-D sources in TCI states for all CORESETs belonging to the same CORESETPoolIndex should be in the same group). The groups may also be based on for example additional SSB/PCI set configured for the UE in the serving cell configuration. Note that using CORESETPoolIndexes to group the beam failure detection reference signals is only suitable for multi-TRP features based on Multi-PDCCH scheduling, and it is not suitable for multi-TRP features based on Single-PDCCH scheduling (given that different CORESETPoolIndexes are not scheduled to a UE in the case of multi-TRP based on single-PDCCH scheduling).

Hence, in another embodiment, a group identifier (e.g., an integer index) that is different from the CORESETPoolIndex is associated with each CORESET. With this embodiment, the SSB/CSI-RS used as QCL type-D sources in TCI states for all CORESETs associated with the same group identifier should be in the same beam failure detection reference signal group. With the introduction of a group identifier different from the CORESETPoolIndex, beam failure detection reference signal groups can be defined for Multi-TRP features based on single-PDCCH scheduling when no SSB/CSI-RS are explicitly configured as beam detection reference signals.

In another embodiment, the mapping of BFD RS to per TRP follows the TCI state mapping a UE has received by MAC CE specified in 38.321 section 6.1.3.24. That is, when the MAC CE indicates certain TCI states to be mapped to certain TRPs for PDSCH reception, the UE uses these same reference signals as BFD resources.

The number of resources the UE needs to monitor for BFD can be defined. It may be that the UE is required to monitor N resources per TRP (CORESETPoolindex, or MAC CE or RRC grouping), or per additional SSB/PCI/the main SSB/PCI the UE has in the serving cell configuration. In another example, a MAC CE or DCI may be used to update the UE which resources to monitor out of the ones that are RRC configured. That is, in RRC a set of resources is configured per TRP (or per a group index or CORESET- PoolIndex) and one default resource per TRP is configured. Further, MAC CE or DCI may change the resource to be monitored per TRP.

```
RadioLinkMonitoringRS ::=                       SEQUENCE {
radioLinkMonitoringRS-Id                          RadioLinkMonitoringRS-Id,
purpose                                         ENUMERATED {beamFailure, rlf, both},
detectionResource                                 CHOICE {
ssb-Index                                       SSB-Index,
csi-RS-Index                                       NZP-CSI-RS-ResourceId
},
...
detectionResource-r17                             SEQUENCE {
resourceSet1                                    SEQUENCE (SIZE (1..maxNrofRS-Resources)) OF
CandidateResourceSet
resourceSet2                                    SEQUENCE (SIZE (1..maxNrofRS-Resources)) OF
CandidateResourceSet
}
CandidateResourceSet ::= SEQUENCE {               CHOICE {
ssb-Info                        SEQUENCE {
SSB-Index,
SSBSet-Index
},
csi-RS-Index                                    NZP-CSI-RS-ResourceId
},
isDefault                                       BOOLEAN
}
}
```

Joint Multi-PCI BFD

In one example, the reference signal resources for BFD (e.g. set of SSBs and/or CSI-RSs) are configured as part of the Serving Cell Configuration (IE ServingCellConfig), within the Downlink BWP Configuration (IE BWP-DownlinkDedicated), where for each BFD resource, the UE can be configured with an associated PCI. The configured PCI for a given resource can be one of the PCIs of the Serving Cell (wherein the UE can perform inter-PCI/multi-TRP, wherein each of the PCIs may be transmitted by a different TRP) and/or, one of the PCIs of the Serving Cell (wherein the UE can perform L1/L2-centric mobility). A UE can be provided, for each BWP of a serving cell, a set q0 of periodic CSI-RS resource configuration indexes by failureDetectionResources and a set q1 of periodic CSI-RS resource configuration indexes and/or SS/PBCH block indexes by candidateBeamRSList or candidateBeamRSListExt-r16 or candidateBeamRSSCellList-r16 for radio link quality measurements on the BWP of the serving cell, wherein each of these CSI-RS and/or SS/PBCH resources are associated to a PCI.

The physical layer in the UE assesses the radio link quality according to the set q0 of resource configurations against the threshold Qout,LR. For the set q0, the UE assesses the radio link quality only according to periodic CSI-RS resource configurations, or SS/PBCH blocks on one of the PCI(s) associated to the PCell or the PSCell, that are QCL with the DM-RS of PDCCH receptions monitored by the UE.

In this example, the BFD resources are jointly configured for the different PCIs, as there is a common set of BFD resources with each resource possibly associated to a different PCI.

An example is shown below:

```
BWP-DownlinkDedicated ::=                       SEQUENCE {
[...]
radioLinkMonitoringConfig                       SetupRelease { RadioLinkMonitoringConfig }
OPTIONAL,       -- Need M
[...]
}
[...]
RadioLinkMonitoringConfig information element
ASN1START
TAG-RADIOLINKMONITORINGCONFIG-START
RadioLinkMonitoringConfig ::=                   SEQUENCE {
failureDetectionResourcesToAddModList      SEQUENCE
(SIZE(1..maxNrofFailureDetectionResources)) OF RadioLinkMonitoringRS
OPTIONAL, -- Need N
failureDetectionResourcesToReleaseList   SEQUENCE
(SIZE(1..maxNrofFailureDetectionResources)) OF RadioLinkMonitoringRS -Id
OPTIONAL, -- Need N
beamFailureInstanceMaxCount                     ENUMERATED {n1, n2, n3, n4, n5, n6, n8,
n10}        OPTIONAL, -- Need R
beamFailureDetectionTimer                       ENUMERATED {pbfd1, pbfd2, pbfd3, pbfd4,
pbfd5, pbfd6, pbfd8, pbfd10} OPTIONAL, -- Need R
...
}
RadioLinkMonitoringRS ::=                        SEQUENCE {
radioLinkMonitoringRS-Id                          RadioLinkMonitoringRS-Id,
purpose                                         ENUMERATED {beamFailure, rlf, both},
```

-continued

```
detectionResource                    CHOICE {
ssb-Index                       SSB-Index,
csi-RS-Index                        NZP-CSI-RS-ResourceId
},
pci
                                     PhysCellId OPTIONAL, -- Need R
...
}
TAG-RADIOLINKMONITORINGCONFIG-STOP
ASN1STOP
PhysCellId
The PhysCellId identifies the physical cell identity (PCI).
PhysCellId information element
ASN1START
TAG-PHYSCELLID-START
PhysCellId ::=              INTEGER (0..1007)
TAG-PHYSCELLID-STOP
-- ASN1STOP
```

Independent Multi-PCI BFD

In another example, the reference signal resources for BFD (e.g. set of SSBs and/or CSI-RSs) are configured as part of the Serving Cell Configuration (IE ServingCellConfig), within the Downlink BWP Configuration (IE BWP-DownlinkDedicated), wherein a BFD resource list is provided per PCI.

In the case of the UE being configured with multi-TRP/inter-PCI for the set of PCIs, the BFD resources are monitored per PCI independently i.e. for each set of BFD resources being monitored, per PCI, there can be indications being generated by the lower layers.

In the case of the UE being configured with L1/L2 centric mobility for the set of PCIs, the BFD resources are monitored per PCI independently i.e. each time the UE changes PCI (e.g. with a MACE CE) the UE changes the BFD resources to be monitored to the ones associated to the new PCI.

An example is shown below:

```
BWP-DownlinkDedicated ::=             SEQUENCE {
[...]
radioLinkMonitoringConfig             SetupRelease { RadioLinkMonitoringConfig }
OPTIONAL,   -- Need M
[...]
}
[...]
RadioLinkMonitoringConfig information element
ASN1START
TAG-RADIOLINKMONITORINGCONFIG-START
RadioLinkMonitoringConfig ::= SEQUENCE {
failureDetectionResourcesToAddModListPerPCI SEQUENCE (SIZE (1..N)) OF
RadioLinkMonitoringRSPerPCI OPTIONAL, -- Need N
[...]
OPTIONAL, -- Need N
beamFailureInstanceMaxCount               ENUMERATED {n1, n2, n3, n4, n5, n6, n8,
n10}                    OPTIONAL, -- Need R
beamFailureDetectionTimer                 ENUMERATED {pbfd1, pbfd2, pbfd3, pbfd4,
pbfd5, pbfd6, pbfd8, pbfd10} OPTIONAL, -- Need R
...
}
RadioLinkMonitoringRSPerPCI ::= SEQUENCE {
pci
                                          PhysCellId OPTIONAL, -- Need R
failureDetectionResourcesToAddModList SEQUENCE (SIZE(1..K)) OF
RadioLinkMonitoringRS
}
RadioLinkMonitoringRS ::=              SEQUENCE {
radioLinkMonitoringRS-Id                  RadioLinkMonitoringRS-Id,
purpose                    ENUMERATED {beamFailure, rlf, both},
detectionResource               CHOICE {
ssb-Index                       SSB-Index,
csi-RS-Index                        NZP-CSI-RS-ResourceId
},
...
}
TAG-RADIOLINKMONITORINGCONFIG-STOP
ASN1STOP
PhysCellId
The PhysCellId identifies the physical cell identity (PCI) .
PhysCellId information element
```

-continued

```
ASN1START
TAG-PHYSCELLID-START
PhysCellId ::=                    INTEGER (0..1007)
TAG-PHYSCELLID-STOP
-- ASN1STOP
```

Joint Multi-Cell BFD

In one embodiment, the reference signal resources for BFD (e.g. set of SSBs and/or CSI-RSs) are configured as part of the Serving Cell Configuration (IE ServingCellConfig), within the Downlink BWP Configuration (IE BWP-DownlinkDedicated), wherein for each BFD resource, the UE can be configured with a PCI associated to one of serving cells within a configured serving cell set.

The configured PCI for a given resource can be one of the PCIs associated to one of the cells of the Serving Cell Set (wherein the UE can perform inter-cell/multi-TRP, wherein each of the PCIs may be transmitted by a different TRP and/or be a different cell within the Set of Serving Cells) and/or, one of the PCIs of the Serving Cell Set (wherein the UE can perform L1/L2-centric mobility). A UE can be provided, for each BWP of a serving cell, a set $\bar{q}_0$ of periodic CSI-RS resource configuration indexes by failureDetectionResources and a set $\bar{q}_1$ of periodic CSI-RS resource configuration indexes and/or SS/PBCH block indexes by candidateBeamRSList or candidateBeamRSListExt-r16 or candidateBeamRSSCellList-r16 for radio link quality measurements on the BWP of the serving cell set, wherein each of these CSI-RS and/or SS/PBCH resources are associated to a serving cell within a serving cell set. The physical layer in the UE assesses the radio link quality according to the set $\bar{q}_0$ of resource configurations against the threshold Qout,LR.

For the set $\bar{q}_0$, the UE assesses the radio link quality only according to periodic CSI-RS resource configurations, or SS/PBCH blocks on one of the cells associated to the Serving Cell Set, that are QCL with the DM-RS of PDCCH receptions monitored by the UE. In this solution the BFD resources are jointly configured for the different cells within the Serving Cell Set, as there is a common set of BFD resources with each resource possibly associated to a different PCI (i.e. to a different cell within the Serving Cell Set).

Independent Multi-Cell BFD

In another embodiment, the reference signal resources for BFD (e.g. set of SSBs and/or CSI-RSs) are configured as part of the Serving Cell Configuration (IE ServingCellConfig), within the Downlink BWP Configuration (IE BWP-DownlinkDedicated), wherein a BFD resource list is provided per cell of a Set of Serving Cell(s).

In the case of the UE being configured with multi-TRP/inter-PCI for the set of serving cells, the BFD resources are monitored per cell independently, i.e. for each set of BFD resources being monitored, per cell within the set of serving cells, there can be indications being generated by the lower layers.

In the case of the UE being configured with L1/L2 centric mobility for the set of cells, the BFD resources are monitored per cell independently, i.e. each time the UE changes cells (e.g. with a MACE CE) the UE changes the BFD resources to be monitored to the ones associated to the new cell.

In this example, the UE may have a ServingCellConfig associated to the set of Serving Cell(s), as a UE-specific configuration that is valid as the UE moves with L1/L2-centric mobility and/or as the UE connects to multiple TRPs/cells (intra-frequency) simultaneously.

Failure Detection

In some embodiments, when reference signals used as QCL-type D sources for the TCI state used for the CORESETs are used as beam failure detection reference signals, then beam failure is detected in one TRP if one of the following conditions is met: (1) beam failure is detected on a first TRP (associated with a first CORESETPoolIndex value) when beam failure is detected on all reference signals, or in one, or a configured combination, used as QCL-type D sources for the TCI states used for the CORESETs associated with a first CORESETPoolIndex value, or (2) beam failure is detected on a second TRP (associated with a second CORESETPoolIndex value) when beam failure is detected on all reference signals or in one, or a configured combination, used as QCL-type D sources for the TCI states used for the CORESETs associated with a second CORESETPoolIndex.

In another embodiment, the UE is configured with BFD resources related to more than two TRPs. Even if BFD resources the UE monitors simultaneously would be for two TRPs, the additional TRPs for which BFD resources are configured can be seen as potential TRPs for the operation. The configured BFD resources may be linked to downlink TCI states that define the special direction for the given TRP. Or the BFD resources may be linked to CORESETs that the UE is configured with. In an another embodiment, the UE performs BDF per CORESET in case one CORESET is associated to one TRP.

Failure Detection Based on in-Sync (IS)/Out-of-Sync (OOS)

The UE monitors the configured RS resource(s) and generates OOS indications/IS indications per RS group. The UE indicates that one RS group is out-of-sync if the quality of all RSs in the RS group are below a certain limit. The UE indicates that one RS group is in-sync if the quality of any RS in the RS group is above a certain limit.

The metrics based on which the UE determines the in-sync or out of sync can be determined per CORESET-PoolIndex or per SSB/PCI set or per other split within the serving cell BFD procedure. For example, parameters corresponding to the existing rlmInSyncOutOfSyncThreshold, as described in TS 38.133 for Qout, can be derived. After a certain number of consecutive OOS indications for one RS group, failure is triggered for the RS group. BeamFailureDetectionTimer is defined per TRP.

Currently the counting of IS and OOS and timer handling are defined in the MAC layer. In one example, however, the physical layer maintains the IS and OOS counters and provides to the MAC layer a beam failure indication per CORESET group4.

In one embodiment, the instances of IS and OOS per coresetPoolindex (TRP index), or per additional SSB/PCI in the physical layer are defined and the counting is handled at the physical layer. The counting and indication to MAC layer can be done in different ways.

In one embodiment, the physical layer indicates BFD to the MAC layer only when a number (e.g. N) of OOS events happen for one TRP. e.g. report to the MAC layer if 5 OOS per TRP is seen but not to report to the MAC layer if 2 per TRP1 and 3 per TRP2 are counted by the physical layer. This indication to the MAC layer may also include which TRP failed. It may also be left for the MAC layer or even the network to deduce it based on reporting aspects. In another aspect, the physical layer determines directly when BFR is triggered and then the MAC layer needs to be changed to act on "there is BFR."

In the mTRP multi-PCI case, for example, a single MAC entity in the MAC layer is defined for the case the UE connects to multiple TRPs (i.e. is configured with mTRP), wherein each TRP may be associated to a different PCI.

For joint BFD for multiple TRPs, the physical layer in the UE monitors BFD jointly for the multiple TRPs (possibly associated to the multiple PCIs) and the UE provides an indication to higher layers when the radio link quality for all corresponding resource configurations in the set q0 that the UE uses to assess the radio link quality (and associated to the multiple TRPs, possibly associated to multiple PCIs) is worse than the threshold Qout,LR (also common for the multiple TRP).

For independent BFD for each TRP, the physical layer in the UE monitors BFD independently for each of the configured TRPs (possibly associated to the multiple PCIs). The physical layer provides an indication to higher layers when, for a number of times N, the radio link quality for all corresponding resource configurations in the set q0 that the UE uses to assess the radio link quality (and associated to the multiple TRPs, possibly associated to multiple PCIs) is worse than the threshold Qout,LR (also common for the multiple TRP). In other words, the physical layer only indicates to the MAC layer/entity when BFD would need to be declared for one TRP. The physical layer to monitor the BFI counter for each TRP, then, if one of them fulfills the criteria and reaches a maximum value, the physical layer indicates to the MAC layer/entity, so that the MAC layer/entity triggers BFD. In one option, the physical layer indicates a BFD per TRP event. In another option, the physical layer indicates a batch of OOS events, e.g. N events simultaneously so that it is still the MAC layer that makes the count and compares it with the BFI counter. Note that the number of OOS events counted for all TRPs may exceed the BFI counter. However, that is not visible to the MAC layer as the physical layer makes sure that this is monitored independently. One advantage is that these procedures per TRP are not visible to the MAC layer.

In another option, the physical layer may also indicate which TRP (and possibly associated pool index and/or PCI) is the one where BFD is being declared e.g. so the MAC layer takes different actions depending on which TRP has BFD.

In the mTRP multi-PCI case, multiple MAC sub-entities are defined for the case the UE connects to multiple TRPs (i.e. is configured with mTRP), wherein each TRP may be associated to a different PCI, and BFD is monitored per MAC sub-entity.

In the mTRP multi-cell case, a single MAC entity is defined for the case the UE connects to multiple TRPs (i.e. is configured with mTRP), wherein each TRP may be associated to a different cell.

For joint BFD for multiple TRPs, the physical layer in the UE monitors BFD jointly for the multiple TRPs (possibly associated to the multiple cells) and the UE provides an indication to higher layers when the radio link quality for all corresponding resource configurations in the set q0 that the UE uses to assess the radio link quality (and associated to the multiple TRPs, possibly associated to multiple cells) is worse than the threshold Qout,LR (also common for the multiple TRP).

For independent BFD for each TRP, the physical layer in the UE monitors BFD independently for each of the configured TRPs (possibly associated to the multiple cells). The physical layer provides an indication to higher layers when, for a number of times N, the radio link quality for all corresponding resource configurations in the set q0 that the UE uses to assess the radio link quality (and associated to the multiple TRPs, possibly associated to multiple cells) is worse than the threshold Qout,LR (also common for the multiple TRP). In other words, the physical layer only indicates to the MAC entity when BFD would need to be declared for one TRP. The physical layer to monitor the BFI counter for each TRP, then, if one of them fulfills the criteria and reaches a maximum value, the physical layer indicates to the MAC layer, so that the MAC layer triggers BFD. In one option, the physical layer indicates a BFD per TRP event. In another option, the physical layer indicates a batch of OOS events e.g. N events simultaneously so that it is still the MAC layer that makes the count and compares it with the BFI counter. Note that the number of OOS events counted for all TRPs may exceed the BFI counter. However, that is not visible to the MAC layer as the physical layer makes sure that this is monitored independently. One advantage is that these procedures per TRP are not visible to the MAC layer. In another option, the physical layer may also indicate which TRP (and possibly associated pool index and/or PCI) is the one where BFD is being declared e.g. so the MAC layer takes different actions depending which TRP has BFD.

In the mTRP multi-cell case, multiple MAC sub-entities are defined for the case the UE connects to multiple TRPs (i.e. is configured with mTRP), wherein each TRP may be associated to a different cell within the serving cell set, and BFD is monitored per MAC sub-entity.

The UE may base the failure detection on Layer 1 (L1)-RSRP threshold similar to existing values provided by rsrp-ThresholdSSB or rsrp-ThresholdBFR-r16, for example In one example, the UE is configured to select the strongest measurement result within RSs for one RS group.

In another example, the UE is configured to select the weakest measurement result within RSs for one RS group.

In another example, the UE calculates an average over the M strongest measurement results where M may be configurable, or there may be RSRP/SINR threshold to select the M RS.

In another example, the selection function consists of the network configuring a default Radio Link Monitoring (RLM) RS (RLM-RS) resource out of the other configured RS RLM resources (which may have been configured for other purposes, such as beam failure detection) to be monitored by the UE, the UE measuring a given quantity for that specifically configured resource (e.g. RSRP, RSRQ, SINR, or any measurement quantity) that can either be defined as fixed (e.g. only SINR or RSRP) or configurable, the UE using the measurement result to be compared with a Qout to possibly generate out-of-sync indications to the higher layers to assist the triggering of the RLF timer.

For example, the RSs can be associated to the CORESETs.

FIG. 1 illustrates an example use case. FIG. 1 illustrates a UE 102 in communication with a first TRP 102 and a second TRP 104. More specifically, TRP 102 generates a first Tx beam 111 to transmit data to UE 102 and TRP 104 generates a second Tx beam 112 to transmit data to UE 102.

In some embodiments, TRP 104 is associated with a first PCI (PCI-1) and TRP 106 is associated with a second PCI (PCI-2). UE 102 can be configured as described herein to detect a beam failure.

FIG. 2 illustrates a process 200 performed by the UE 102 in some embodiments. Process 100 may begin in step s202.

Step s202 comprises UE 102 receiving one or more messages (e.g. one or more MAC CE) for activating at least i) a first set of configured TCI states (e.g., one or more TCI states) and ii) a second set of configured TCI states, wherein the first set of activated TCI states is associated with a first PCI and indicates a first set of reference signals (e.g. one or more RSs), and the second set of activated TCI states is associated with a second PCI and indicates a second set of reference signals.

Step s204 comprises UE 102 performing beam failure detection, BFD, monitoring, wherein performing the BFD monitoring comprises at least one of: determining whether a beam failure with respect to the first PCI has occurred based on the first set of reference signals (step s206); or determining whether a beam failure with respect to the second PCI has occurred based on the second set of reference signals (step s208).

In some embodiments, the UE is not explicitly configured with any reference signal for BFD monitoring in the RadioLinkMonitoringConfig IE.

In some embodiments, the first set of activated TCI states includes a first TCI state that indicates a first reference signal, the second set of activated TCI states includes a second TCI state that indicates a second reference signal, the first set of reference signals includes the first reference signal, but does not include the second reference signal, and the second set of reference signals includes the second reference signal, but does not include the first reference signal. In some embodiments, the first reference signal is indicated as a QCL-type D source in the first TCI state, and the second reference signal is indicated as a QCL-type D source in the second TCI state.

In some embodiments, receiving one or more messages for activating the first and second sets of TCI states comprises: receiving first a Medium Access Control, MAC, control element, CE, for activating the first set of TCI states and receiving a second MAC CE for activating the second set of TCI states, or receiving a single MAC CE for activating both the first and second set of TCI states.

In some embodiments, determining whether a beam failure with respect to the first PCI has occurred based on the first set of reference signals comprises maintaining a first out-of-sync (OOS) counter for the first PCI; and determining whether a beam failure with respect to the second PCI has occurred based on the second set of reference signals comprises maintaining a second OOS counter for the second PCI. In some embodiments, the first OOS counter is a counter maintained by a) a physical layer of the UE or b) a MAC layer of the UE, and the second OOS counter is a counter maintained by a) the physical layer of the UE or b) the MAC layer of the UE. In some embodiments, the first OOS counter is maintained by the MAC layer of the UE, and maintaining the first OOS counter comprises: the physical layer providing to the MAC layer an OOS indication indicating an occurrence of an OOS event for the first PCI; and the MAC layer increasing a counting value of the first OOS counter in response to receiving the indication.

In some embodiments, the first OOS counter is maintained by the physical layer of the UE, and maintaining the first OOS counter comprises the physical layer increasing a counting value of the first OOS counter as a result of detecting an occurrence of an OOS event for the first PCI.

In some embodiments, determining whether a beam failure with respect to the first PCI has occurred comprises: determining that the value of the first OOS counter is greater than or equal to a predetermined threshold value; and, as a result of determining that the value of the first OOS counter is greater than or equal to the predetermined threshold value, the physical layer providing to the MAC layer an indication that a beam failure has occurred for the first PCI.

In some embodiments, process 200 also includes, prior to receiving said one or messages, receiving a configuration message (e.g., RRC configuration message) indicating that the first set of configured TCI states is configured for the first PCI and the second set of configured TCI states is configured for the second PCI.

In some embodiments, the first set of activated TCI states further includes a third TCI state that indicates a third reference signal, the second set of activated TCI states includes a fourth TCI state that indicates a fourth reference signal, the first TCI state is for a first control resource set, CORSET, belonging to a first CORESET group, the second TCI state is for a second CORSET belonging to a second CORESET group, the third TCI state is for a third CORSET belonging to the first CORESET group, and the fourth TCI state is for a fourth CORSET belonging to the second CORESET group.

In some embodiments, the first set of reference signals includes the first and third reference signals, but does not include the second and fourth reference signal, and the second set of reference signals includes the second and fourth reference signals, but does not include the first and third reference signals.

In some embodiments, the UE is in an L1/L2 mobility associated with a plurality of PCIs including the first and second PCIs or the UE is being served by multiple Transmission and Reception Points, TRPs, associated with a plurality of PCIs, including the first and second PCIs.

FIG. 3A illustrates another process 300 that may be performed by UE 102. Process 300 includes UE 102 receiving configuration information comprising: a) a first set of detection resources associated with TRP 104 associated with a first PCI or first SSB and b) a second set of detection resources associated with TRP 106 associated with a second PCI or second SSB (s302). In some embodiments, the first PCI has the same value as the second PCI. In some embodiments, the configuration information further comprises monitoring information identifying a number, N, of BFD resources and/or a number, N, of resources the UE may need to monitor for BFD. In some embodiments, the monitoring information indicates a number N of resources the UE needs to monitor per TRP, e.g. by default.

In some embodiments, the configuration information further comprises identification information identifying one or more detection resources the UE needs to monitor for BFD.

In some embodiments, process 300 also includes UE 102 receiving a message (e.g. DCI or MAC/CE) comprising identification information, wherein the identification information identifies one or more detection resources the UE needs to monitor for BFD, e.g. the message updating a default information FIG. 3B illustrates another process 320 that may be performed by UE 102. Process 320 includes UE 102 maintaining a first counter (IS or OOS counter) for a first TRP (or) (step s322). Process 300 also includes UE 102 maintaining (s1024) a second counter (IS or OOS counter) for a second PCI (or TRP) (step s324).

In some embodiments, the first counter and/or the second counter is located on any one of the physical (PHY) layer in the UE or the MAC layer in the UE.

In some embodiments, the first counter is located on the MAC layer in the UE, and the process further includes: the physical layer (PHY) in the UE providing to the MAC layer (e.g. signaling occurs from PHY layer to MAC layer) in the UE an indication of an occurrence of an out-of-sync for the first PCI (or TRP); and the MAC layer increasing a counting value (e.g. increasing the counting value occurs at MAC layer level) of the first counter in response to receiving the indication.

In some embodiments, the process 320 further includes the physical layer in the UE determining the number of an occurrence of an out-of-sync for the first PCI (or TRP) (e.g. determination occurs at PHY layer level); determining whether the number of an occurrence of an out-of-sync is greater than or equal to a predetermined threshold value; and, as a result of determining that whether the number of an occurrence of an out-of-sync is greater than or equal to the predetermined threshold value, the physical layer providing to the MAC layer (e.g. a signal is sent from PHY layer to MAC layer) in the UE an indication that a beam failure has occurred for the first PCI (or TRP).

In some embodiments, the process 320 further includes the physical layer in the UE providing to the MAC layer in the UE (e.g. a signal is sent from PHY layer to MAC layer) identification information identifying the first TRP.

FIG. 3C illustrates another process 340 that may be performed by UE 102. Process 340 includes UE 102 storing configuration information that configures the UE with a BFD procedure defined per Serving Cell Set (or pool or group), wherein each Serving Cell in the Set can be associated with its Physical Cell Identifier (PCI), and/or wherein each cell in the set may be in the same frequency (e.g. SSB's ARFCN for each of the cells being the same) (step s342). In some embodiments, TCI states are configured for the Serving Cell Set (e.g. by associating a PCI to a TCI state configuration), and/or the UE performs multi-TRP/inter-cell operation among the cells within the Serving Cell Set. In some embodiments, TCI states are configured for the Serving Cell Set (e.g. by associating a PCI to a TCI state configuration), and/or the UE can performs L1/L2-centric mobility operation among the cells within the Serving Cell Set.

FIG. 3D illustrates another process 360 that may be performed by UE 102. Process 360 includes UE 102 storing configuration information that configures the UE with a BFD procedure defined for a Serving Cell associated with multiple PCIs, wherein each Serving Cell is configured with TCI states that can be associated with different PCIs (e.g., TCI state Id=5 associated to PCI=102, and TCI state Id=7 associated to PCI=117), and wherein each PCI in the set may be in the same frequency (e.g. SSB's ARFCN for each of the PCIs being the same) (step s362). In some embodiments, TCI states are configured for the Serving Cell (e.g., by associating a PCI to a TCI state configuration), and/or the UE performs multi-TRP/inter-cell operation among the PCIs within the Serving Cell. In some embodiments, TCI states are configured for the Serving Cell (e.g., by associating a PCI to a TCI state configuration), and/or the UE performs L1/L2-centric mobility operation among the PCIs within the Serving Cell.

FIG. 4A illustrates another process 400 that may be performed by a network node (e.g., TRP 104). Process 400 includes the network node transmitting toward UE 102 configuration information comprising: a) a first set of detec-tion resources associated with a first TRP associated with a first PCI or first SSB and b) a second set of detection resources associated with a second TRP associated with a second PCI or second SSB (step s402). In some embodiments, the first PCI has the same value as the second PCI or the first PCI is different from the second PCI. In some embodiments, the configuration information further comprises monitoring information identifying a number of resources the UE needs to monitor for BFD. In some embodiments, the monitoring information indicates that the UE needs to monitor N resources per TRP.

FIG. 4B illustrates another process 420 that may be performed by a network node (e.g., TRP 104). Process 420 includes the network node transmitting toward a UE configuration information that configures the UE with a BFD procedure defined per Serving Cell Set (or pool or group), wherein each Serving Cell in the Set can be associated with its PCI, and/or wherein each cell in the set may be in the same frequency (e.g. SSB's ARFCN for each of the cells being the same) (step s422). In some embodiments, TCI states are configured for the Serving Cell Set (e.g. by associating a PCI to a TCI state configuration), and/or the UE performs multi-TRP/inter-cell operation among the cells within the Serving Cell Set. In some embodiments, TCI states are configured for the Serving Cell Set (e.g. by associating a PCI to a TCI state configuration), and/or the UE can performs L1/L2-centric mobility operation among the cells within the Serving Cell Set.

FIG. 4C illustrates another process 440 that may be performed by a network node (e.g., TRP 104). Process 440 includes the network node transmitting toward UE 102 configuration information that configures the UE with a BFD procedure defined for a Serving Cell associated with multiple PCIs, wherein each Serving Cell is configured with TCI states that can be associated with different PCIs (e.g., TCI state Id=5 associated to PCI=102, and TCI state Id=7 associated to PCI=117), and wherein each PCI in the set may be in the same frequency (e.g. SSB's ARFCN for each of the PCIs being the same) (step s442). In some embodiments, TCI states are configured for the Serving Cell (e.g., by associating a PCI to a TCI state configuration), and/or the UE performs multi-TRP/inter-cell operation among the PCIs within the Serving Cell. In some embodiments, TCI states are configured for the Serving Cell (e.g., by associating a PCI to a TCI state configuration), and/or the UE performs L1/L2-centric mobility operation among the PCIs within the Serving Cell.

FIG. 5 illustrates a process 500 performed be UE 102 in some embodiments. Process 100 may begin in step s502. Step s502 comprises UE 102 forming a first set of one or more BFD reference signal resources for a first PCI (PCI-1). Step s504 comprises UE 102 forming a second set of one or more BFD reference signal resources for a second PCI (PCI-2). Step s506 comprises UE 102 using the first set of BFD reference signal resources to determine whether or not a beam failure with respect to PCI-1 has occurred. Step s508 comprises UE 102 using the second set of BFD reference signal resources to determine whether or not a beam failure with respect to PCI-2 has occurred.

In some embodiments, process 500 also includes UE 102 receiving a first TCI state ID for a first TCI state associated with PCI-1 and also receiving a second TCI state ID for a second TCI state associated with PCI-2. In some embodiments, forming the first set of BFD reference signal resources comprises: determining that the first TCI state ID identifies a TCI state for PCI-1; and, as a result of determining that the first TCI state ID identifies a TCI state for PCI-1, adding to the first set of BFD reference signal resources a reference signal resource for the first TCI state. In some embodiments, forming the second set of BFD reference signal resources comprises: determining that the second TCI state ID identifies a TCI state for PCI-2; and, as a result of determining that the second TCI state ID identifies a TCI state for PCI-1, adding to the second set of BFD reference signal resources a reference signal resource for the second TCI state. In some embodiments, the reference signal resource for the first TCI state that is added to the first set of BFD reference signal resources is indicated as QCL-type D source in first TCI state, and the reference signal resource for the second TCI state that is added to the second set of BFD reference signal resources is indicated as QCL-type D source in first TCI state.

In some embodiments, receiving the first TCI state ID comprises receiving a first MAC CE comprising the first TCI state ID; and receiving the second TCI state ID comprises receiving a second MAC CE comprising the second TCI state ID.

In some embodiments, process 500 also includes maintaining a first counter for PCI-1 and maintaining a second counter for PCI-2. In some embodiments, the first counter is a counter maintained by a) a physical layer of the UE or b) a MAC layer of the UE, and the second counter is a counter maintained by a) the physical layer of the UE or b) the MAC layer of the UE. In some embodiments, the first counter is maintained by the MAC layer of the UE, and the process further includes: the physical layer providing to the MAC layer an OOS, indication indicating an occurrence of an OOS event for the PCI-1; and the MAC layer increasing a counting value of the first counter in response to receiving the indication.

In some embodiments, process 500 further includes the physical layer in the UE detecting a number of OOS events for PCI-1; determining whether the number of detected OOS events is greater than a predetermined threshold value; and as a result of determining that the number of detected OOS events is greater than a predetermined threshold value, the physical layer providing to the MAC layer an indication that a beam failure has occurred for PCI-1.

FIG. 6 is a block diagram of UE 102, according to some embodiments. As shown in FIG. 6, UE 102 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like); communication circuitry 648, which is coupled to an antenna arrangement 649 comprising one or more antennas and which comprises a transmitter (Tx) 645 and a receiver (Rx) 647 for enabling UE 102 to transmit data and receive data (e.g., wirelessly transmit/receive data); and a storage unit (a.k.a., "data storage system") 608, which may include one or more non-volatile storage devices and/or one or more volatile storage devices. In embodiments where PC 602 includes a programmable processor, a computer readable medium (CRM) 642 may be provided. CRM 642 stores a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes UE 102 to perform steps described herein (e.g., steps described herein with reference to the flow charts). In other embodiments, UE 102 may be configured to perform steps described herein without the need for code. That is, for example, PC 602 may consist merely of one or more ASICs. Hence, the features of the embodiments described herein may be implemented in hardware and/or software.

FIG. 7 is a block diagram of a network node 700 (e.g., TRP 104 or 106), according to some embodiments for performing the network node methods disclosed herein. As shown in FIG. 7, network node 700 may comprise: processing circuitry (PC) 702, which may include one or more processors (P) 755 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., network node 700 may be a distributed computing apparatus); a network interface 768 comprising a transmitter (Tx) 765 and a receiver (Rx) 767 for enabling network node 700 to transmit data to and receive data from other nodes connected to a network 110 (e.g., an Internet Protocol (IP) network) to which network interface 768 is connected; communication circuitry 748 (e.g., radio transceiver circuitry comprising an Rx 747 and a Tx 745) coupled to an antenna system 749 for wireless communication with UEs or other nodes); and a local storage unit (a.k.a., "data storage system") 708, which may include one or more non-volatile storage devices and/or one or more volatile storage devices. In embodiments where PC 702 includes a programmable processor, a computer readable medium (CRM) 742 may be provided. CRM 742 stores a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes network node 700 to perform steps described herein (e.g., steps described herein with reference to one or more flow charts). In other embodiments, network node 700 may be configured to perform steps described herein without the need for code. That is, for example, PC 702 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:

receiving one or more messages for activating at least i) a first set of configured TCI states and ii) a second set of configured TCI states, wherein the first set of activated TCI states is associated with a first physical cell identifier (PCI) and indicates a first set of reference signals, and the second set of activated TCI states is associated with a second PCI and indicates a second set of reference signals; and performing beam failure detection (BFD) monitoring, wherein performing the BFD monitoring comprises:

determining whether a beam failure with respect to the first PCI has occurred based on the first set of reference signals; and determining whether a beam failure with respect to the second PCI has occurred based on the second set of reference signals.

2. The method of claim 1, wherein the UE is not explicitly configured with any reference signals for BFD monitoring.

3. The method of claim 1, wherein the first set of activated TCI states includes a first TCI state that indicates a first reference signal, the second set of activated TCI states includes a second TCI state that indicates a second reference signal, the first set of reference signals includes the first reference signal, but does not include the second reference signal, and the second set of reference signals includes the second reference signal, but does not include the first reference signal.

4. The method of claim 3, wherein the first reference signal is indicated as a QCL-type D source in the first TCI state, and the second reference signal is indicated as a QCL-type D source in the second TCI state.

5. The method of claim 3, wherein the first set of activated TCI states further includes a third TCI state that indicates a third reference signal, the second set of activated TCI states includes a fourth TCI state that indicates a fourth reference signal, the first TCI state is for a first control resource set, CORSET, belonging to a first CORESET group, the second TCI state is for a second CORSET belonging to a second CORESET group, the third TCI state is for a third CORSET belonging to the first CORESET group, and the fourth TCI state is for a fourth CORSET belonging to the second CORESET group.

6. The method of claim 5, wherein the first set of reference signals includes the first and third reference signals, but does not include the second and fourth reference signal, and the second set of reference signals includes the second and fourth reference signals, but does not include the first and third reference signals.

7. The method of claim 1, wherein receiving one or more messages for activating the first and second sets of TCI states comprises:

receiving first a Medium Access Control (MAC) control element (CE) for activating the first set of TCI states and receiving a second MAC CE for activating the second set of TCI states, or receiving a single MAC CE for activating both the first and second set of TCI states.

8. The method of claim 1, wherein determining whether a beam failure with respect to the first PCI has occurred based on the first set of reference signals comprises maintaining a first out-of-sync (OOS) counter for the first PCI; and determining whether a beam failure with respect to the second PCI has occurred based on the second set of reference signals comprises maintaining a second OOS counter for the second PCI.

9. The method of claim 8, wherein the first OOS counter is a counter maintained by a) a physical layer of the UE or b) a MAC layer of the UE, and the second OOS counter is a counter maintained by a) the physical layer of the UE or b) the MAC layer of the UE.

10. The method of claim 9, wherein the first OOS counter is maintained by the MAC layer of the UE, and maintaining the first OOS counter comprises:

the physical layer providing to the MAC layer an OOS indication indicating an occurrence of an OOS event for the first PCI; and the MAC layer increasing a counting value of the first OOS counter in response to receiving the indication.

11. The method of claim 9, wherein:

the first OOS counter is maintained by the physical layer of the UE, and maintaining the first OOS counter comprises the physical layer increasing a counting value of the first OOS counter as a result of detecting an occurrence of an OOS event for the first PCI.

12. The method of claim 11, wherein determining whether a beam failure with respect to the first PCI has occurred comprises:

determining that the value of the first OOS counter is greater than or equal to a predetermined threshold value; and as a result of determining that the value of the first OOS counter is greater than or equal to the predetermined threshold value, the physical layer providing to the MAC layer an indication that a beam failure has occurred for the first PCI.

13. The method of claim 12, further comprising, prior to receiving said one or messages, receiving a configuration message indicating that the first set of configured TCI states is configured for the first PCI and the second set of configured TCI states is configured for the second PCI.

14. The method of claim 1, wherein the UE is in an L1/L2 mobility associated with a plurality of PCIs including the first and second PCIs or the UE is being served by multiple Transmission and Reception Points (TRPs) associated with a plurality of PCIs, including the first and second PCIs.

15. A non-transitory computer readable storage medium storing a computer program comprising instructions which when executed by processing circuitry of a UE causes the UE to perform the method of claim 1.

16. A user equipment (UE), comprising:

a receiver for receiving one or more messages for activating at least i) a first set of configured TCI states and ii) a second set of configured TCI states, wherein the first set of activated TCI states is associated with a first physical cell identifier (PCI) configured for the UE and indicates a first set of reference signals, and the second set of activated TCI states is associated with a second PCI configured for the UE and indicates a second set of reference signals;

processing circuitry; and a memory containing instructions executable by the processing circuitry, wherein the UE is configured to perform beam failure detection (BFD) monitoring, wherein performing the BFD monitoring comprises:

determining whether a beam failure with respect to the first PCI has occurred based on the first set of reference signals; and determining whether a beam failure with respect to the second PCI has occurred based on the second set of reference signals.

17. The UE of claim 16, wherein the first set of activated TCI states includes a first TCI state that indicates a first reference signal, the second set of activated TCI states includes a second TCI state that indicates a second reference signal, the first set of reference signals includes the first reference signal, but does not include the second reference signal, and the second set of reference signals includes the second reference signal, but does not include the first reference signal.

18. The UE of claim 17, wherein the first reference signal is indicated as a QCL-type D source in the first TCI state, and the second reference signal is indicated as a QCL-type D source in the second TCI state.

19. The UE of claim 16, wherein determining whether a beam failure with respect to the first PCI has occurred based on the first set of reference signals comprises maintaining a first out-of-sync (OOS) counter for the first PCI; and determining whether a beam failure with respect to the second PCI has occurred based on the second set of reference signals comprises maintaining a second OOS counter for the second PCI.

20. The UE of claim 19, wherein the first OOS counter is a counter maintained by a) a physical layer of the UE or b) a MAC layer of the UE, and the second OOS counter is a counter maintained by a) the physical layer of the UE or b) the MAC layer of the UE.

* * * * *